United States Patent
Ichikawa et al.

(10) Patent No.: US 6,450,582 B2
(45) Date of Patent: Sep. 17, 2002

(54) WHEEL COVER

(75) Inventors: Takashi Ichikawa; Toshinobu Mizutani, both of Aichi (JP)

(73) Assignee: Kabushiki Kaisha Toka Rika Denki Seisakusho, Niwa-gun (JP)

(*) Notice: Subject to any disclaimer, the term of this patent is extended or adjusted under 35 U.S.C. 154(b) by 0 days.

(21) Appl. No.: 09/793,591

(22) Filed: Feb. 27, 2001

(30) Foreign Application Priority Data

Mar. 24, 2000 (JP) ........................................ 2000-083806

(51) Int. Cl.⁷ ................................................. B60B 7/06
(52) U.S. Cl. ................................ 301/37.36; 301/37.102
(58) Field of Search ........................ 301/37.101, 37.102, 301/37.31, 37.34, 37.12, 37.35, 37.36, 37.42

(56) References Cited

U.S. PATENT DOCUMENTS

| | | | |
|---|---|---|---|
| 2,148,995 A | * | 2/1939 | Nelson |
| 3,397,920 A | * | 8/1968 | Aske, Jr. et al. |
| 4,438,979 A | * | 3/1984 | Renz et al. |
| 4,679,861 A | * | 7/1987 | Narita et al. |
| 4,735,460 A | * | 4/1988 | Tomida et al. |

FOREIGN PATENT DOCUMENTS

| | | | | |
|---|---|---|---|---|
| GB | 1128902 | * | 10/1968 | .............. 301/37.35 |
| JP | 3-109101 | * | 5/1991 | .............. 301/37.35 |
| JP | 3-109102 | * | 5/1991 | .............. 301/37.35 |

* cited by examiner

Primary Examiner—Russell D. Stormer
(74) Attorney, Agent, or Firm—Morgan, Lewis & Bockius LLP

(57) ABSTRACT

A plurality of elastic, deformable fixing pieces (22) the front end (22a) of each of which is engaged with a second curved concave part (16) of a rim (14), are disposed on the reverse side (21a) of a cover body (21) made of synthetic resin, and a plurality of engagement convex parts (23) that are engaged with engagement holes (26) of the fixing piece (22), respectively, and maintain a state in which the fixing pieces (22) are curved are disposed on the reverse side (21a) thereof. Each fixing piece (22) and each engagement convex part (23) that are the attaching elements of the wheel cover (20) are formed integrally with the cover body (21) made of synthetic resin, and all the wheel cover (20) is made of synthetic resin, and therefore recyclability can be improved. Additionally, since other members, such as wire rings, are not needed, weight saving can be achieved.

12 Claims, 4 Drawing Sheets

WHEEL COVER

BACKGROUND OF THE INVENTION

1. Technical Field

The present invention relates to a wheel cover in which a fixing mechanism of fixing the wheel cover to a disk wheel of an automobile is formed integrally with a wheel cover body.

2. Related Art

Generally, a related structure shown in FIG. 6 is known for mounting a wheel cover onto a disk wheel of an automobile. In more detail, the wheel cover 1 is made of synthetic resin. Engagement claws 3 (in the figure, only one claw is shown) formed integrally with a cover body 2 of the wheel cover 1 are disposed at plural positions in the circumferential direction at the outer periphery of the back side of the cover body 2. Metallic wire rings 4 are disposed at the radially inner side of the engagement claws 3 in order to prevent the engagement claws 3 from being deformed inwardly in the radial direction. An engagement convex part 3a of the engagement claw 3 is engaged with a concave part 6a of a rim 6 of the disk wheel 5.

However, the related structure is at a disadvantage in that, since the structure is composed of the synthetic resinous wheel cover 1 and the metallic wire rings 4, and they need to be sorted out from each other when recycled, the related structure is inferior in recyclability, and, since the metallic wire ring 4 is a necessary component, weight saving is difficult.

SUMMARY OF THE INVENTION

The present invention has been made in consideration of the foregoing, and an object of the present invention is to provide a wheel cover capable of improving recyclability and, in addition, realizing weight saving.

In order to achieve the object, the wheel cover comprising:

- a cover body made of synthetic resin disposed on a disk wheel of an vehicle to cover a side face of the disk wheel;
- a plurality of elastic deformable fixing pieces formed integrally with the cover body engaged with a rim of the disk wheel;
- a plurality of engagement portions provided with the plurality of fixing pieces, respectively; and
- a plurality of engagement parts formed integrally with the cover body for keeping the plurality of fixing pieces bent by engagement with the plurality of engagement portions.

In the above construction, preferably, the engagement portion forms an engagement hole, the engagement part forms an engagement member to be inserted into the engagement hole. A large diameter part having a diameter larger than a diameter of the engagement hole is formed at an end of the engagement member. The engagement portion is formed at an intermediate part of the fixing piece. An intermediate part of the fixing piece is formed thinner than the other part of the fixing piece. The plurality of fixing pieces and the plurality of engagement parts are formed on a face of the cover body opposed to the side face of the disk wheel.

In the above-mentioned structure, when the wheel cover is mounted onto the disk wheel, each front end of the fixing pieces is first engaged with the rim of the disk wheel in such a way as to allow the cover body to cover the side face of the disk wheel. Thereafter, the cover body is pressed against the disk wheel, so that each engagement part of the cover body is engaged with the corresponding engagement portion of the fixing piece. This engagement enables the fixing piece to be kept bent. At this time, the front end of each fixing piece presses against the rim because of the elastic force of the fixing piece. The pressing force allows the disk wheel to hold the wheel cover. In this case, since each fixing piece is kept bent because of the engagement with the engagement part, the wheel cover can maintain the state of being fixed to the disk wheel without using other members such as wire rings.

Additionally, since each fixing piece and each engagement part that are the fixing mechanism of the wheel cover are formed integrally with the cover body made of synthetic resin, and all of the wheel cover is made of synthetic resin, recyclability can be improved. Additionally, since other members, such as wire rings, are not needed, weight saving can be realized.

DESCRIPTION OF PREFERRED EMBODIMENT

An embodiment of the present invention will be described hereinafter with reference to FIGS. 1 to 5.

Figure 2:
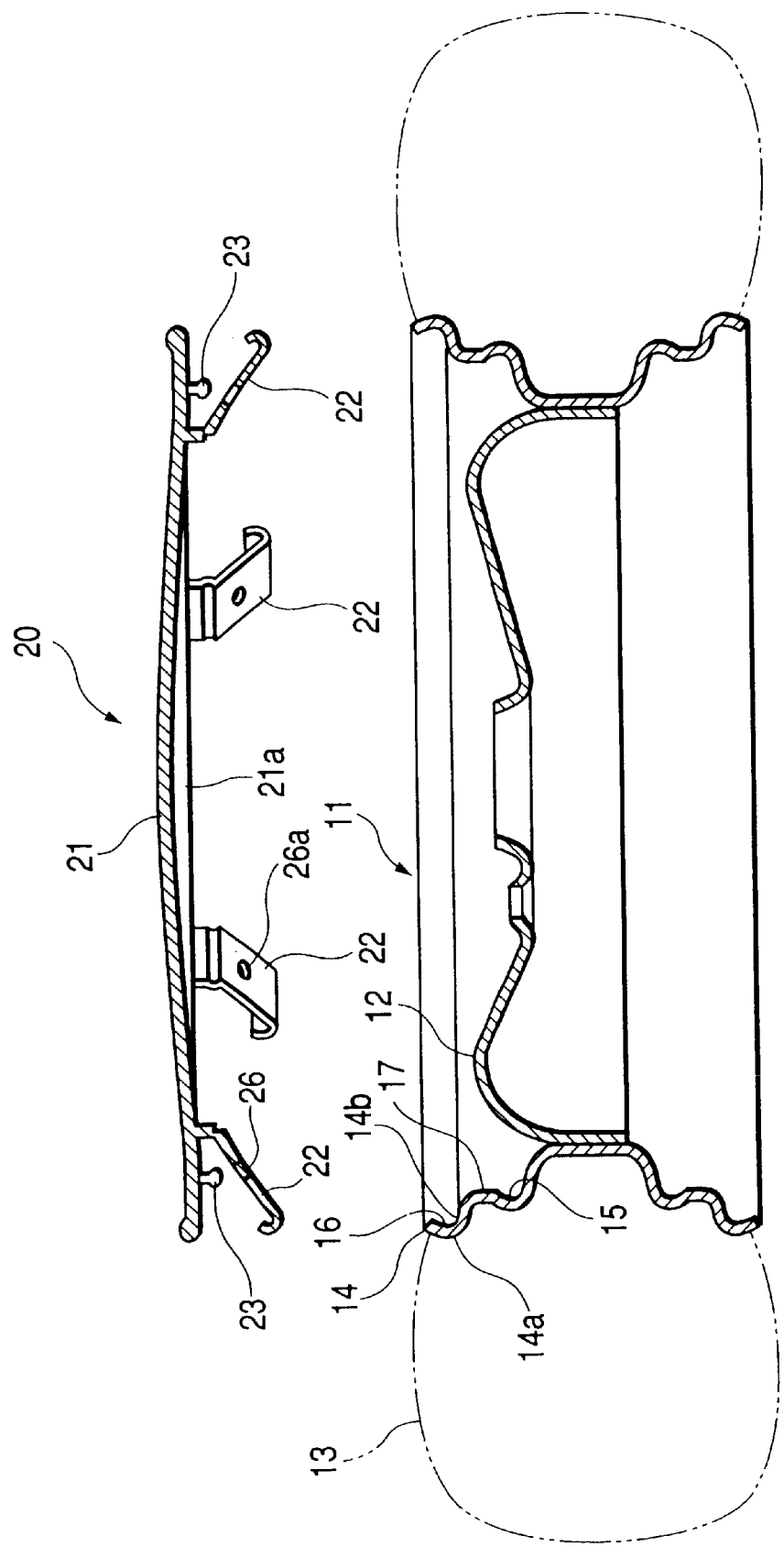
FIG. 2 is a sectional view in which the disk wheel and the wheel cover are separated.

As shown in FIG. 2, a disk wheel 11 has a structure in which a metallic disk 12 to be attached to a vehicle and a metallic rim 14 on which a tire 13 is fixedly mounted are formed integrally with each other.

The rim 14 has first and second curved concave parts 15, 16 and a curved convex part 17 along the whole periphery thereof. The first and second curved concave parts 15, 16 are formed so that the side of an inner surface 14b opposite to the side of an outer surface 14a onto which the tire 13 is mounted is concave. The curved convex part 17 is located between the first and second curved concave parts 15, 16 and whose inner surface 14b is convex.

Figure 3:
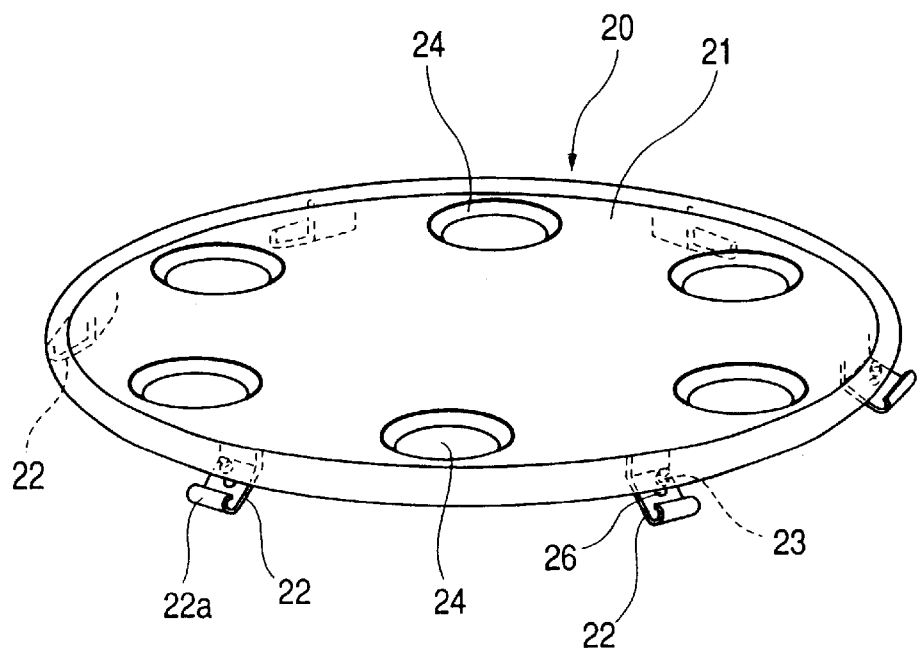
FIG. 3 is a perspective view of the wheel cover.

As shown in FIG. 3, the wheel cover 20 is made of synthetic resin and comprise: a cover body 21 shaped like a disk; a plurality of fixing pieces 22 (six fixing pieces in this example) spaced out evenly in the circumferential direction at the outer periphery of the back side 21a of the cover body 21; and six engagement members 23 that are engagement parts disposed on the back side 21a of the cover body 21 in correspondence with the respective fixing pieces 22. The cover body 21, the fixing pieces 22, and the engagement, members 23 are formed by integral molding.

Figure 4:
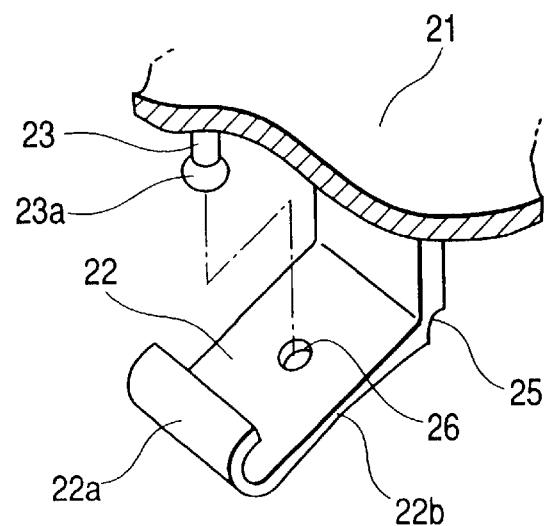
FIG. 4 is an enlarged perspective view of the main part of the wheel cover.
Figure 5:
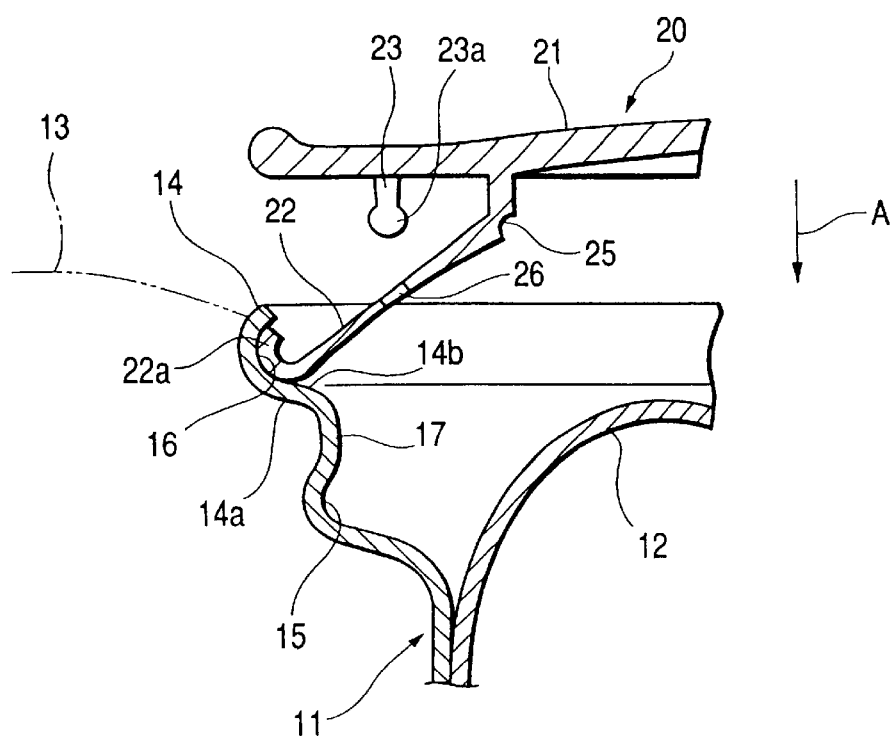
FIG. 5 is a sectional view of the main part of the wheel cover that has not completely been fixed to the disk wheel yet.
Figure 6:
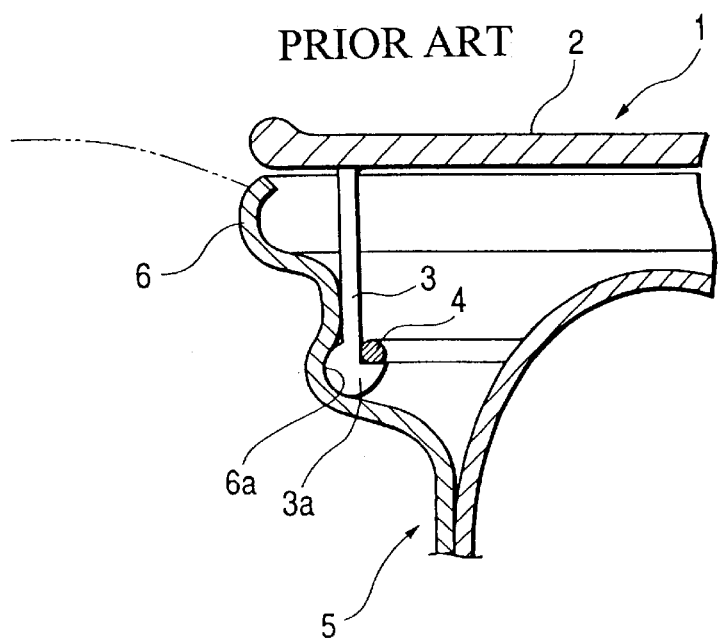
FIG. 6 shows a related art, corresponding to FIG. 1.

The cover body 21 is shaped like a disk slightly larger than the outline of the front end of the rim 14, and has a sufficient size to cover the side face of the disk wheel 11. The cover body 21 has a plurality of openings 24. A so-called self-hinge 25 is formed at the base of each fixing piece 22 as shown in FIGS. 4 and 5. Each fixing piece 22 is bent so that the front end 22a of the fixing piece 22 is directed outwardly in the radial direction with the self hinge 25 as a fulcrum. The front end 22a of the fixing piece 22 is curved so as to fit the second curved concave part 16 of the end side of the rim 14 thereto. In the fixing piece 22, an intermediate part 22b in the extending direction is formed to be slightly thinner than the other part of the fixing piece 22 so as to easily bend. The intermediate part 22b has a circular engagement hole 26 that is the part to be engaged.

Figure 1:
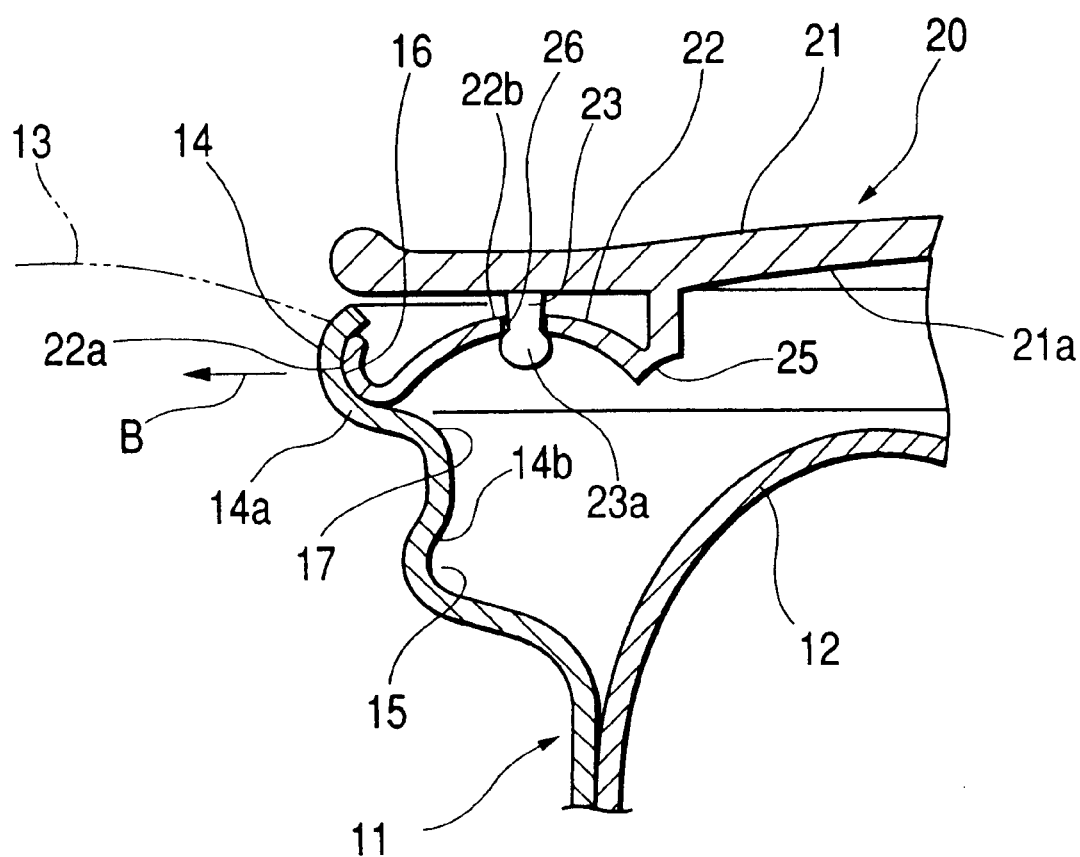
FIG. 1 is a sectional view of a main part of a wheel cover fixed to a disk wheel, showing an embodiment of the present invention.

The engagement member 23 is designed to be disposed at a position corresponding to the engagement hole 26 and be engaged with the engagement hole 26 when the corresponding fixing piece 22 is bent as shown in FIG. 1 and FIG. 5. A large diameter part 23a for preventing the member 23 from sliding out of the engagement hole 26 is formed at the tip of the engagement convex part 23.

In the above-mentioned structure, the wheel cover 20 is mounted onto the disk wheel 11 as follows.

First, the wheel cover 20 is placed on the disk wheel 11 whose side face is directed upward. At this time, the front end 22a of each fixing piece 22 of the wheel cover 20 is brought into contact with the second curved concave part 16 of the rim 14 and is engaged therewith (see FIG. 5). Thereafter, after confirming that the front ends 22a of all the fixing pieces 22 are evenly engaged with the second curved concave parts 16 of the rim 14, the cover body 21 is pressed against the disk wheel 11 (see arrow A of FIG. 5). As a result, the front end 22a of the fixing piece 22 is pressed against the inner surface of the second curved concave part 16 of the rim 14 (see arrow B of FIG. 1), and, accordingly, the intermediate part 22b of the fixing piece 22 is elastically bent so as to protect toward the cover body 21, and the engagement member 23 is inserted into the engagement hole 26 and is engaged therewith (see FIG. 1). This engagement allows the fixing piece 22 to maintain the state of being curved.

At this time, the front end 22a of the fixing piece 22 is in a state of pressing against the inner surface 14a of the rim 14 because of the elastic force of each fixing piece 22, and the wheel cover 20 is held by the disk wheel 11 because of this pressing force of each fixing piece 22. In this case, since each fixing piece 22 can maintain the state of being curved by the engagement between the engagement member convex part 23 and the engagement hole 26, the wheel cover 20 can maintain the state of being fixed to the disk wheel 11 without using other members such as wire rings.

Since the fixing piece 22 and the engagement member convex part 23 that are the fixing means of the wheel cover 20 are formed integrally with the cover body 21 made of synthetic resin, respectively, and all the wheel cover 20 is made of synthetic resin, recyclability can be improved. Additionally, since other members, such as wire rings, are not needed, and weight saving can be achieved.

As described above, according to the present invention, since each fixing piece serving as a fixing means of the wheel cover presses against the rim while being curved, and maintains the curved state by the engagement with the engagement convex part, the wheel cover can maintain the state of being fixed to the disk wheel without using other members such as wire rings. Additionally, since the fixing piece and the engagement part each serving as a fixing means of the wheel cover are formed integrally with the cover body made of synthetic resin, and all the wheel cover is made of synthetic resin, recyclability can be improved. Additionally, since other members, such as wire rings, are not needed, weight saving can be achieved.

What is claimed is:

1. A wheel cover comprising:
   a cover body made of synthetic resin disposed on a disk wheel of a vehicle to cover a side face of the disk wheel;
   a plurality of elastic deformable fixing pieces formed integrally with the cover body engaged with a rim of the disk wheel;
   a plurality of engagement portions provided with the plurality of fixing pieces, respectively;
   a plurality of engagement parts formed integrally with the cover body, each of the engagement parts being coupled to a respective one of the engagement portions such that the fixing pieces are bent towards the cover body.

2. The wheel cover according to claim 1, wherein the engagement portion is formed at an intermediate part of the fixing piece.

3. The wheel cover according to claim 1, wherein the fixing piece includes an intermediate part located between other parts of the fixing piece, and the intermediate part of the fixing piece is formed thinner than the other parts of the fixing piece.

4. The wheel cover according to claim 1, wherein the plurality of fixing pieces and the plurality of engagement parts are formed on a face of the cover body opposed to the side face of the disk wheel.

5. A wheel cover according to claim 1, wherein the fixing pieces are bent at an integral self hinge.

6. A wheel cover according to claim 1, the fixing pieces including a self hinge end, and a front end opposite the self hinge end, wherein the front end is directed outwardly in the radial direction of the wheel cover.

7. A wheel cover according to claim 6, wherein the fixing pieces are bent at the self hinge.

8. A wheel cover according to claim 1, wherein the engagement portions include holes for engaging the engagement parts.

9. A wheel cover comprising:
   a cover body made of synthetic resin disposed on a disk wheel of a vehicle to cover a side face of the disk wheel;
   a plurality of elastic deformable fixing pieces formed integrally with the cover body engaged with a rim of the disk wheel;
   a plurality of engagement portions provided with the plurality of fixing pieces, respectively;
   a plurality of engagement parts formed integrally with the cover body; for keeping the plurality of fixing pieces bent by engagement with the plurality of engagement portions plurality of fixing pieces bent by engagement with the plurality of engagement portions, wherein the engagement portion forms an engagement hole, the engagement part forms an engagement convex part to be inserted into the engagement hole.

10. The wheel cover according to claim 9, wherein a large diameter part having a diameter larger than a diameter of the engagement hole is formed at an end of the engagement convex part.

11. A wheel cover comprising:
    a synthetic resin disk wheel cover body adapted to cover a side face of a disk wheel;
    a plurality of fixing pieces integral with the cover body and adapted to engage with a rim of the disk wheel;
    a plurality of engagement parts integral with the cover body;
    the fixing pieces each having an intermediate part;
    the fixing pieces engage with a concave part of the rim of the disk wheel when the cover body is pressed against the disk wheel and when the intermediate part is bent to project toward the cover body.

12. A wheel cover according to claim 11, wherein each intermediate part includes an engagement portion, and the engagement parts engage with the engagement portions to maintain the cover body pressed against the disk wheel.

* * * * *